United States Patent
Hisano et al.

(10) Patent No.: US 11,237,651 B2
(45) Date of Patent: Feb. 1, 2022

(54) DETECTION METHOD OF ACTIVE STYLUS

(71) Applicant: Wacom Co., Ltd., Saitama (JP)

(72) Inventors: Haruhiko Hisano, Kanagawa (JP); Hideyuki Hara, Tokyo (JP)

(73) Assignee: Wacom Co., Ltd., Saitama (JP)

(*) Notice: Subject to any disclaimer, the term of this patent is extended or adjusted under 35 U.S.C. 154(b) by 0 days.

(21) Appl. No.: 17/102,356

(22) Filed: Nov. 23, 2020

(65) Prior Publication Data

US 2021/0072842 A1 Mar. 11, 2021

Related U.S. Application Data

(63) Continuation of application No. 16/505,799, filed on Jul. 9, 2019, now Pat. No. 10,845,899.

(Continued)

(30) Foreign Application Priority Data

Oct. 2, 2018 (JP) .............................. JP2018-187806

(51) Int. Cl.
*G06F 3/038* (2013.01)
*G06F 3/0354* (2013.01)
*G09G 3/20* (2006.01)

(52) U.S. Cl.
CPC .......... *G06F 3/038* (2013.01); *G06F 3/03545* (2013.01); *G09G 3/20* (2013.01); *G09G 2370/10* (2013.01)

(58) Field of Classification Search
CPC .... G06F 3/038; G06F 3/03545; G06F 3/0442; G06F 3/04162; G06F 9/4411;

(Continued)

(56) References Cited

U.S. PATENT DOCUMENTS

2016/0092010 A1* 3/2016 Agarwal .................. G09G 5/12
345/173
2016/0179226 A1* 6/2016 Shepelev .............. G06F 3/0442
345/174

FOREIGN PATENT DOCUMENTS

EP 3 316 102 A1 10/2017
JP 6166497 B1 7/2017

OTHER PUBLICATIONS

Extended European Search Report, dated Jan. 28, 2020, for European Application No. 19188557,3-1210, 12 pages.

(Continued)

*Primary Examiner* — Andrew Sasinowski
(74) *Attorney, Agent, or Firm* — Seed IP Law Group LLP

(57) ABSTRACT

A method in a system including an active stylus and a display controller that detects the active stylus and that drives a display device. The method includes: driving the display device to display first pixel data during a first display period in a first time period, wherein the driving is started a first amount of time and ended a second amount of time after the beginning of the first time period; and driving the display device to display second pixel data during a second display period in a second time period, wherein the driving is started a third amount of time and ended a fourth amount of time after the beginning of the second time period. The first and second display periods have a same time length. The first amount of time is different from the third amount of time, and the second amount of time is different from the fourth amount of time.

8 Claims, 5 Drawing Sheets

Related U.S. Application Data

(60) Provisional application No. 62/712,790, filed on Jul. 31, 2018.

(58) Field of Classification Search
CPC .... G06F 3/1407; G09G 3/20; G09G 2370/10; G09G 2370/04; G09G 2354/00; G09G 5/12
See application file for complete search history.

(56) References Cited

OTHER PUBLICATIONS

European Official Communication, dated Aug. 19, 2021, for European Application No. 19 188 557,3-1210, 7 pages.

* cited by examiner

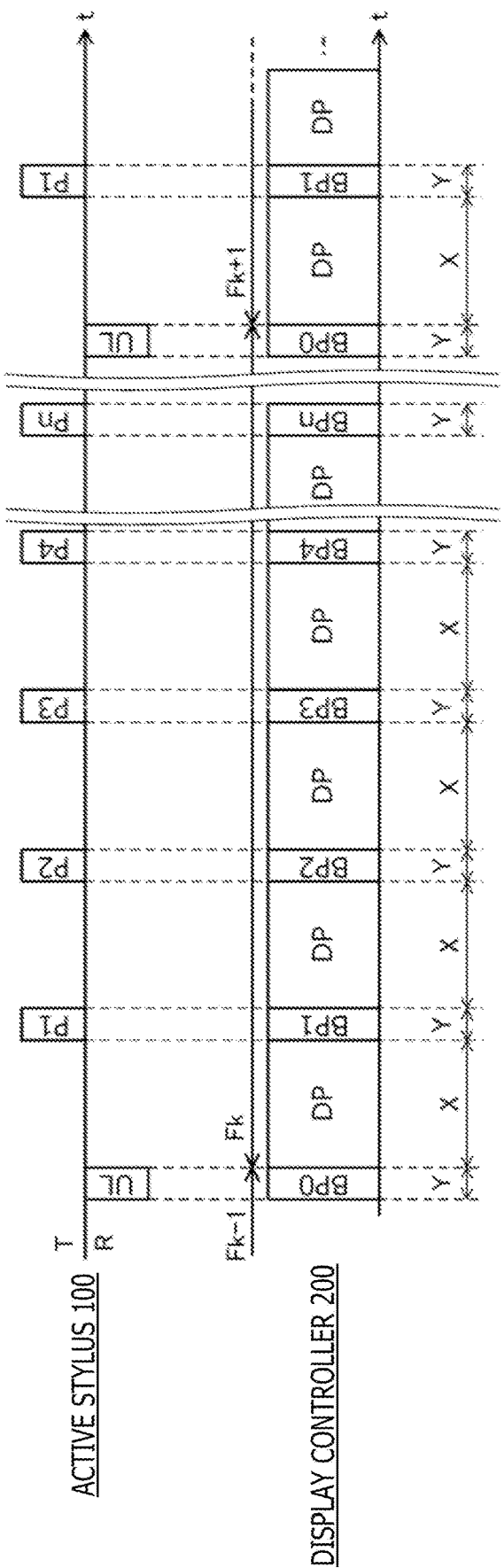

DETECTION METHOD OF ACTIVE STYLUS

BACKGROUND

Technical Field

The present disclosure relates to a detection method of an active stylus, and particularly to a detection method of an active stylus in a display controller that performs display driving.

2. Description of the Related Art

As a redisplay controller that is used to drive a display panel, a display controller is known which is configured such that it can perform detection of an active stylus. In a display controller of the type described, a period (display driving period) in which pixels are driven for displaying and a period (blanking period) in which a pen signal transmitted from an active stylus is received are provided time-divisionally. The blanking period is a period in which driving operation of pixels is not performed and is typically configured from a vertical blanking period, a horizontal blanking period, a period including a predetermined number of horizontal blanking periods or the like. During the blanking period, since noise arising from driving operation of pixels is not generated, the display controller can receive a pen signal in a state in which the amount of noise is small.

Japanese Patent No. 6166497 (hereinafter referred to as Patent Document 1) discloses an example of such a display controller as just described. The document discloses a technology for notifying a position of a blanking period in one display frame from the display controller to an active stylus using an uplink signal. According to the technology, the active stylus can know a timing at which a pen signal is to be transmitted to the display controller from which the uplink signal has been transmitted.

Incidentally, since an uplink signal is used in various applications in addition to notification of the position of a blanking period, it cannot be used for notification of a position of a blanking period in every frame. Therefore, according to the technology of Patent Document 1, the display controller cannot change the position of a blanking period for several frames until it becomes possible to re-notify the position of a blanking period. If the position of a blanking period is fixed in this manner, then displaying driving operation becomes discontinuous at a same position successively in a plurality of display frames. Therefore, such a reduction in the display quality as appearance of a visually observable horizontal line and sounding occurs.

In regard to such a subject as just described, Patent Document 1 discloses that a short auxiliary uplink signal is transmitted in each blanking period. If this auxiliary uplink signal is used, then since the display controller can notify the active stylus of an accurate position of a blanking period, also it is possible to solve the subject described above. However, part of a blanking period that is originally short is occupied by the auxiliary uplink signal, and this results in a decrease of the amount of data that can be transmitted including a pen signal from the active stylus.

BRIEF SUMMARY

Accordingly, one of the subjects of the present disclosure resides in provision of a detection method of an active stylus by which, while the quantity of data that can be transmitted by a pen signal is secured, it is possible to eliminate such a reduction in the display quality as appearance of a visually observable horizontal line or sounding.

According to a first aspect of the present disclosure, there is provided a method in a system including an active stylus and a display controller that detects the active stylus and that drives a display device, the method including: transmitting, by the active stylus, a first packet including a plurality of bit values during a first display frame; retransmitting, by the active stylus, the first packet during the first display frame; driving, by the display controller, the display device to display a first part of a plurality of pixel data configuring the first display frame during a first display driving period, receiving, by the display controller, the first packet during a blanking period following the first display driving period, and driving, by the display controller, the display the display device to display a second part of the plurality of pixel data configuring the first display frame during a second display driving period following the blanking period, the first part of the plurality of pixel data being different from the second part of the plurality of pixel data.

According to a second aspect of the present disclosure, there is provided a method in a system including an active stylus and a display controller that detects the active stylus and that controls a display device, the method including: transmitting by the active stylus, a plurality of packets during a plurality of packet transmission periods set with a given time interval placed therebetween in advance during each of a plurality of display frames; receiving, by the display controller, the packets transmitted from the active stylus during the plurality of packet transmission periods during each of the plurality of display frames; driving, by the display controller, the display device to display pixel data; and changing, by the display controller, a start timing or an end timing of a display driving period in which the driving is performed, while the time interval set between the plurality of packet transmission periods is maintained.

According to the first aspect of the present disclosure, since the active stylus transmits a packet of the same substance at least twice during a first display frame, the display controller can change the position of the blanking period at its own convenience without transmitting an auxiliary uplink signal. Accordingly, while the quantity of data that can be transmitted by a pen signal is secured, it is possible to eliminate such a reduction in the display quality as appearance of a visually observable horizontal line or sounding.

According to the second aspect of the present disclosure, the display controller can change the start timing and the end timing of a display driving period without transmitting an auxiliary uplink signal. Accordingly, it becomes possible to eliminate at least a reduction in the display quality that may possibly be caused by fixation of the start timing and the end timing of the display driving period while the quantity of data that can be transmitted by a pen signal is secured.

BRIEF DESCRIPTION OF THE DRAWINGS

FIG. 5 is a view depicting a detection method of an active stylus according to the background art of the present disclosure.

DETAILED DESCRIPTION OF THE PREFERRED EMBODIMENTS

In the following, embodiments of the present disclosure are described with reference to the accompanying drawings.

Figure 1:
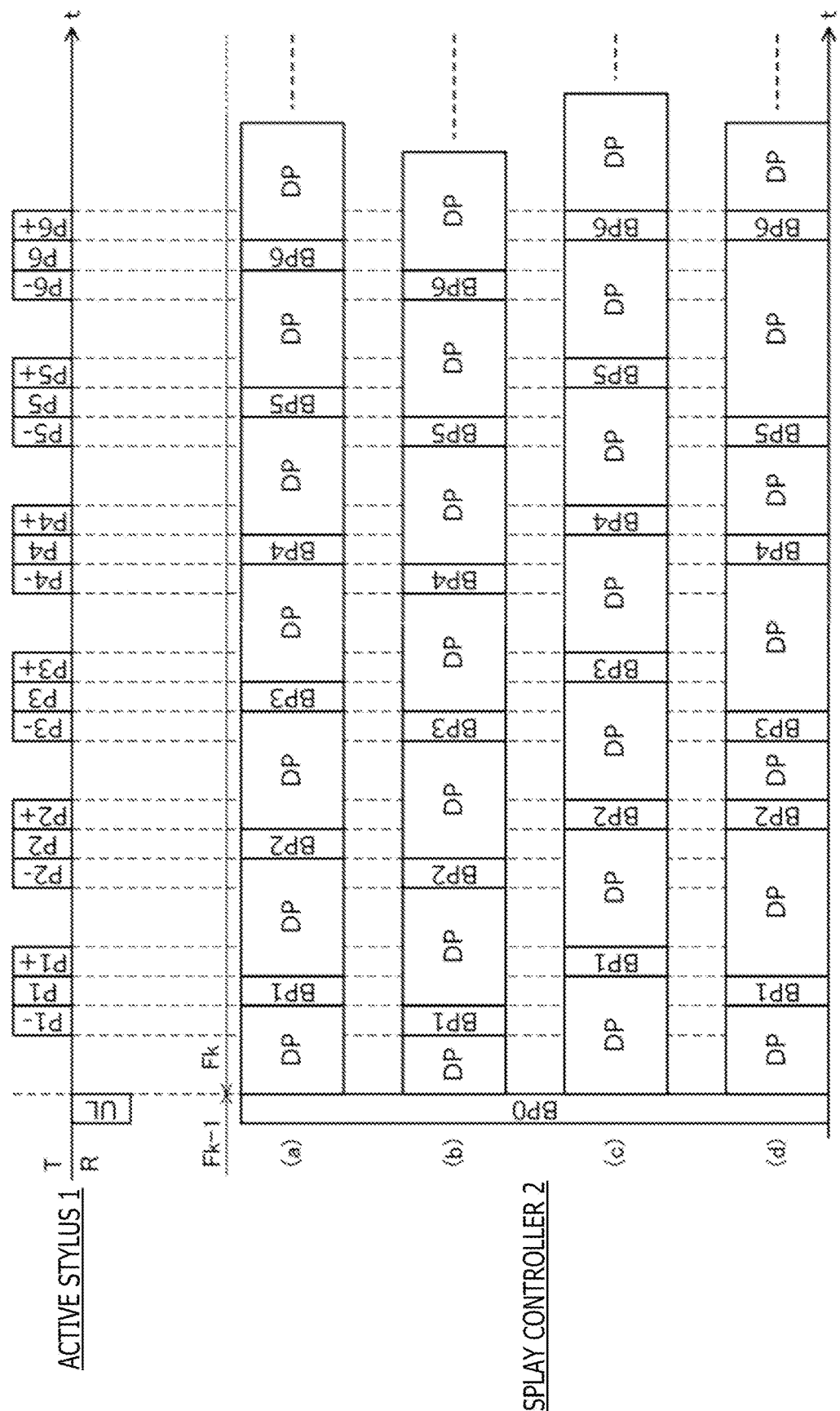
FIG. 1 is a view depicting a detection method of an active stylus according to a first embodiment of the present disclosure.

FIG. 1 is a view depicting a detection method of an active stylus 1 according to a first embodiment of the present disclosure. The active stylus 1 and a display controller 2 depicted in FIG. 1 are devices that configure a position detection system that allows pen input to the display face. The active stylus 1 is a pen-type device configured for gripping by a user and configures an inputting device of the position detection system. Further, the display controller 2 is an integrated circuit built in a computer such as a tablet terminal and plays a role of driving a display device not depicted in accordance with display data supplied from a processor not depicted, a role of detecting the position of the active stylus 1 in the display face and reporting the position to the processor and a role of receive data transmitted from the active stylus 1 and transferring the data to the processor. In one or more embodiments, the display controller 2 includes a processor coupled to a memory storing a program that, when performed by the processor, causes the display controller 2 to perform the methods described herein.

It is to be noted that, for the display device, various display devices such as a liquid crystal display or an organic EL display can be used. Further, also for the driving method for the display device, various types such as an active matrix type and a simple matrix type can be used.

The active stylus 1 and the display controller 2 are configured for bidirectional communication. In the following description, a signal transmitted from the display controller 2 to the active stylus 1 is referred to as "uplink signal UL" and a signal transmitted from the active stylus 1 to the display controller 2 is referred to as "pen signal P."

The pen signal P is a signal time-divisionally including a non-modulated burst signal and a data signal modulated with transmission data from the active stylus 1. The burst signal is transmitted to allow the display controller 2 to detect the position of the active stylus 1.

The uplink signal UL is a signal including a command for controlling operation of the active stylus 1 from the display controller 2. The command includes, for example, timing information indicative of a timing at which the active stylus 1 is to transmit a pen signal P, transmission data information indicative of data (writing pressure value, stylus ID and so forth) to be included into and transmitted together with a data signal from the active stylus 1 and so forth. In regard to the timing information, the display controller 2 and the active stylus 1 have stored therein in advance a plurality of pieces of preset information each including a time length of a display frame (time length from a timing at which the active stylus 1 receives an uplink signal UL), disposition of a plurality of blanking periods in the display frame and information that specifies, from among the plurality of blanking periods, a blanking period that can be used for transmission of a pen signal P by the active stylus 1. The timing information is information that specifies one of the plurality of pieces of reset information.

A pen point electrode is provided in the proximity of a pen point of the active stylus 1. Further, the display controller 2 is connected to a plurality of linear electrodes (not depicted) disposed in a display plane. The display controller 2 performs transmission of an uplink signal UL and reception of a pen signal P through a capacitance formed between the linear electrodes and the pen point electrode. The display controller 2 may receive a pen signal P in the form of a burst signal and detect the position of the active stylus 1 in the display plane on the basis of the reception strengths at the linear electrodes. Further, the display controller 2 may receive a pen signal P that is a data signal and demodulate the received data signal to acquire data transmitted from the active stylus 1.

In response to reception of an uplink signal UL through the pen point electrode, the active stylus 1 generates a pen signal P including a burst signal and a data signal that includes data designated by transmission data information in the uplink signal UL. Then, the generated pen signal P is transmitted time-divisionally in a plurality of blanking periods indicated by the timing information in the uplink signal UL. In the following description, each part of the pen signal P transmitted time-divisionally in this manner is sometimes referred to as "packet." Each packet is data configured including a plurality of bit values. The display controller 2 couples the packets received sequentially to acquire the pen signal P and performs detection of the position of the active stylus 1 and reception of the data transmitted from the active stylus 1 as described above.

In the following, a particular example of a detection method of the active stylus 1 by the display controller 2 is described particularly. However, before the description, a detection method of an active stylus according to the background art of the present disclosure and a subject of the detection method are described, and then the detection method of the active stylus 1 according to the present embodiment is described in detail. It is to be noted that the background art described below was invented by the inventor of the present application but is not publicly known at the point of time of the filing date of the present application.

FIG. 5 is a view illustrating a detection method of an active stylus 100 according to the background art of the present disclosure. It is to be noted that the active stylus 100 and a display controller 200 depicted in FIG. 5 are similar to the active stylus 1 and the display controller 2 according to the present disclosure except the detection method of the active stylus 100 described below.

Display frames Fk−1, Fk and Fk+1 depicted in FIG. 5 represent the k−1th display frame, kth display frame and k+1th display frame, respectively. Further, a period BP represents a period (blanking period) during which driving of the display apparatus by the display controller 200 is resting. A numeral added to the end of each reference character BP is a serial number of the blanking period BP in one display frame. However, the first blanking period BP0 corresponding to a certain display frame is positioned immediately preceding to the display frame. During each display driving period DP, the display controller 200 drives part of a plurality of pixels configuring the display device to display part of a plurality of pixel data configuring the corresponding display frame.

In the lower portion of FIG. 5, a relationship between the display driving period DP and the blanking period BP in the kth display frame Fk and the k+1th display frame Fk+1. Further, in the upper portion of FIG. 5, a period during which the active stylus 100 receives an uplink signal UL and periods during which a plurality of packets configuring a pen signal P are individually transmitted are depicted. It is to be noted that a numeral added to the end of each reference character P represents a serial number in a plurality of packets configuring the pen signal P.

As depicted in FIG. 5, a plurality of display driving periods DP are disposed at predetermined time intervals Y within one display frame. The time lengths of the display driving periods DP have a fixed value X. Since the time interval between two adjacent ones of the display driving periods DP is Y, the time length of each blanking period BP has the fixed value Y.

When display driving corresponding to the display frame Fk is to be performed, the display controller 200 first transmits an uplink signal UL within the blanking period BP0. The active stylus 100 establishes frame synchronism with the display controller 200 with reference to the uplink signal UL transmitted in this manner and acquires timing information or transmission data information described hereinabove from the uplink signal UL. It is to be noted that the display controller 200 does not always transmit timing information and transmission data information with the uplink signal UL but transmits them only in the case when it becomes necessary to change them. In the case where the active stylus 1 acquires timing information or transmission data information, it stores the acquired information and thereafter operates in accordance with the stored information until after timing information or transmission data information is acquired subsequently.

The active stylus 100 is configured such that it transmits packets configuring the pen signal P at timings of a plurality of blanking periods BP indicated by the acquired or stored timing information. The display controller 200 performs detection of the position of the active stylus 1 and reception of data transmitted from the active stylus 1 as described above on the basis of the pen signal P transmitted in this manner.

More particularly, the display controller 200 performs display driving and reception of packets by a sequence of operations described below. In particular, the display controller 200 first performs, within the first display driving period DP, display driving to display part of a plurality of display data that configure the display frame Fk and then receives, during a blanking period BP following the first display driving period DP, a packet transmitted from the active stylus 100, whereafter the display controller 200 performs, during the second display driving period DP following the blanking period BP, display driving thereby to display different part of the plurality of pixel data configuring the display frame Fk.

According to such a detection method as described above, during a period until timing information is notified again by the uplink signal UL, the display controller 200 cannot change the position of the blanking periods BP. If the position of the blanking periods BP is fixed in this manner, then since the display driving operation becomes discontinuous at a same position successively in a plurality of display frames, such a reduction in the display quality as appearance of a visually observable horizontal line and sounding occurs. In the present embodiment, the active stylus 1 is configured such that a same packet is transmitted twice or more within one display one to solve the subject just described. In the following, the detection method of the active stylus 1 according to the present embodiment is described in detail with reference to FIG. 1 again.

First, to the timing information to be transmitted by the display controller 2 according to the present embodiment, information similar to that in the background art described hereinabove with reference to FIG. 5 is set. In particular, the disposition of blanking periods BP to be notified by the timing information indicates the disposition of the blanking periods BP depicted in FIG. 5.

In the upper portion of FIG. 1, a period in which the active stylus 1 receives an uplink signal UL and periods in which the active stylus 1 individually transmits a plurality of packets configuring a pen signal P are depicted. That the active stylus 1 utilizes a blanking period BP notified by the timing information to transmit packets P1 to Pn (n is a natural number equal to or greater than 2) in the kth display frame Fk as depicted in FIG. 1 is similar to that in the background art depicted in FIG. 1. The active stylus 1 according to the present embodiment is configured such that it transmits, in addition to the transmission of the packets P1 to Pn, also other packets P1 (−/+) to Pn (−/+) that include data that is the same as those of the packets P1 to Pn, respectively. It is to be noted that the symbol "−" indicates a packet of the same substance transmitted immediately before the corresponding packet, and the symbol "+" indicates a packet of the same substance transmitted immediately after the corresponding packet.

In other words, the active stylus 1 is configured such that it transmits, within the display frame Fk (first display frame), a packet Pm (m is an integer of 1 to n; first packet) including a plurality of bit values (first transmission) and transmits, within the same display frame Fk, the packet Pm again in the same display frame Fk (second transmission). In the example of FIG. 1, such re-transmission is performed successively twice after the first time transmission, and accordingly, the packets Pm−, Pm and Pm+ of the same substance are successively transmitted within one kth display frame Fk.

As a result of such transmission of a packet performed by the active stylus 1, it becomes possible for the display controller 2 to arbitrarily select the position of a blanking period BP from among a transmission period of the packet Pm−, another transmission period of the packet Pm and a further transmission period of the packet Pm+. The lower portions (a) to (d) in FIG. 1 represent examples of the disposition of a blanking period BP in a display frame as a result of arbitrary selection of the position of each blanking period BP in the display frame.

More particularly, the pattern depicted in portion (a) indicates a pattern in the case where a blanking period BP is disposed in transmission periods of the packets P1 to Pn that are the basis. This disposition is same as that of the background art depicted in FIG. 5. The pattern depicted in portion (b) indicates a pattern in the case where a blanking period BP is disposed in a transmission period of the packet Pm− transmitted immediately before the packet Pm in regard to all values of m. The pattern depicted in portion (c) indicates a pattern in the case where a blanking period BP is disposed in the transmission period of the packet Pm+ transmitted immediately after the packet Pm in regard to all values of m. The pattern depicted in portion (d) indicates a pattern in the case where one of the packets Pm−, Pm, and Pm+ is selected for each value of m and a blanking period BP is disposed in a transmission period of the selected packet.

As described above, with the detection method of the active stylus 1 according to the present embodiment, since the active stylus 1 transmits a packet of the same substance at least twice in one display frame, the display controller 2 can change the position of the blanking period BP at its own convenience without transmitting an auxiliary uplink signal. Accordingly, while the quantity of data that can be transmitted by a pen signal P is secured, it becomes possible to eliminate such a reduction in the display quality as appearance of a visually observable horizontal line or sounding.

It is to be noted that, while the present embodiment is directed to an example in which packets of a same substance are transmitted successively, the present disclosure can be applied suitably also to a case in which packets of a same substance are not transmitted successively.

Figure 2:
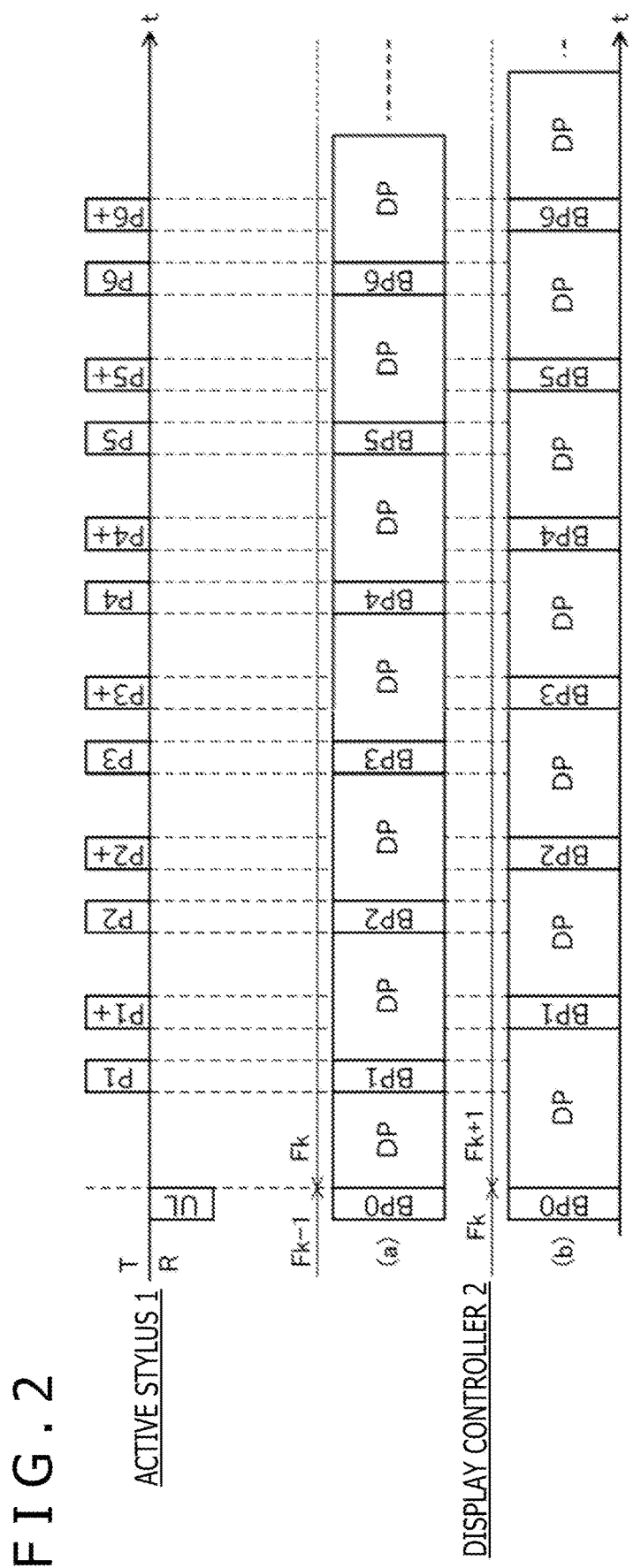
FIG. 2 is a view depicting a detection method of an active stylus according to a modification of the first embodiment of the present disclosure.

For example, FIG. 2 is a view illustrating a detection method of the active stylus 1 according to a modification of the first embodiment described above. Portion (a) of FIG. 2 indicates disposition of a display driving period DP and a blanking period BP in a kth display frame Fk, and portion (b) of FIG. 2 indicates disposition of a display driving period DP and a blanking period BP in a display frame Fk+1. As depicted in FIG. 2, the active stylus 1 according to the present modification transmits two packets Pm and Pm+ of a same substance at intervals. Also with the present specification, the display controller 2 can change the position of the blanking period BP at its own convenience without transmitting an auxiliary uplink signal. Accordingly, while the quantity of data that can be transmitted by a pen signal P is secured, it becomes possible to eliminate such a reduction in the display quality as appearance of a visually observable horizontal line or sounding similarly to the present embodiment.

Now, a second embodiment of the present disclosure is described. According to the present embodiment, the display controller 2 is configured such that display driving is performed while the start timing and the end timing of a display driving period in which display driving is performed are changed while time intervals set between a plurality of packet transmission periods are maintained. Consequently, the reduction in the display quality that may be caused by fixation at least of the start timing and the end timing of a display driving period can be eliminated while the amount of data that can transmitted by a pen signal is secured. Since the second embodiment is similar in regard to the other matters to the first embodiment, like components in the second embodiment to those in the first embodiment are denoted by like reference characters and overlapping description of them is omitted. Thus, the following description is given focusing on differences of the second embodiment from the first embodiment.

Figure 3:
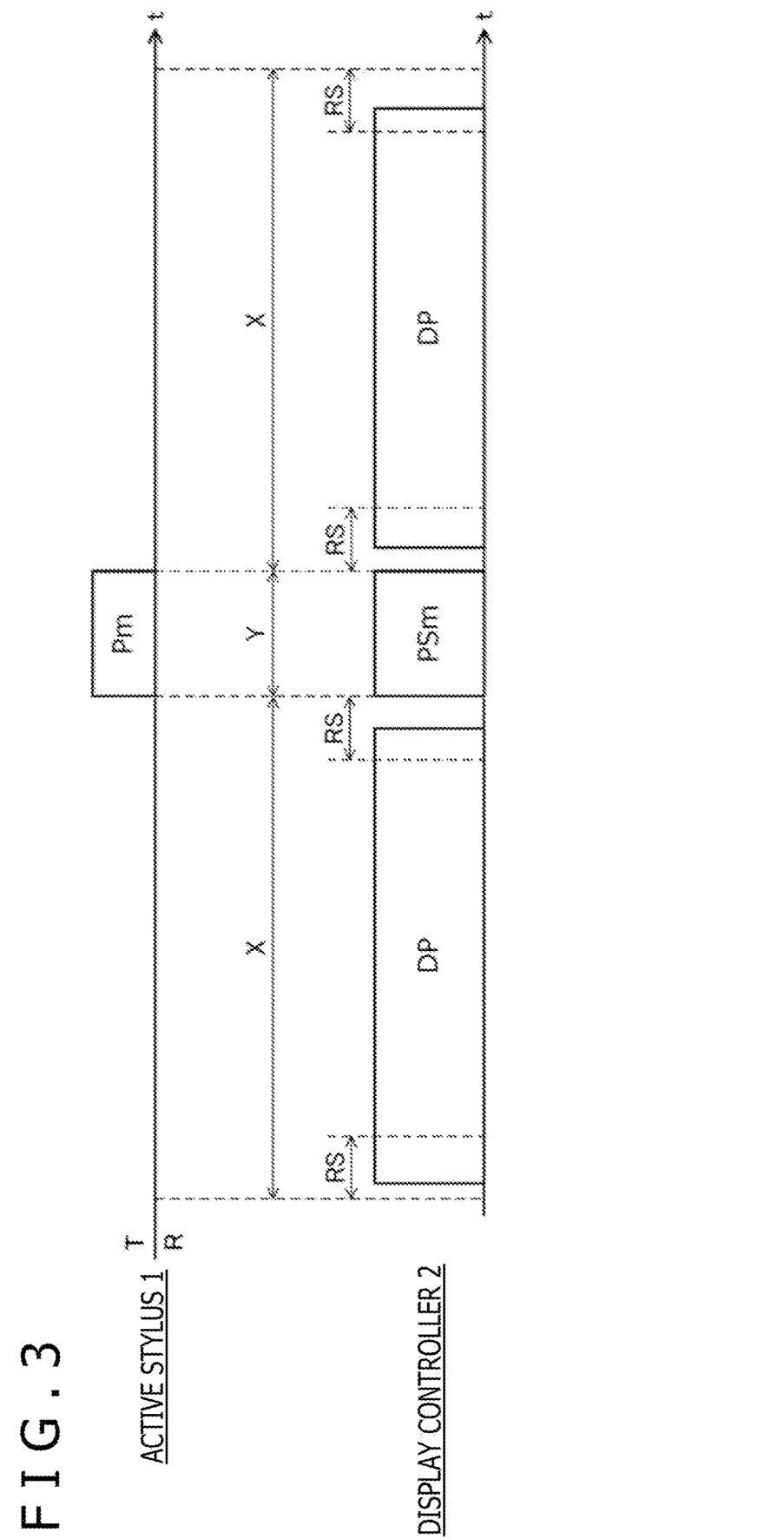
FIG. 3 is a view illustrating a display driving period according to a second embodiment of the present disclosure.

FIG. 3 is a view illustrating a display driving period DP according to the present embodiment. As depicted in FIG. 3, in the present embodiment, a plurality of packet transmission periods PS are set in advance for each of a plurality of display frames. The plurality of packet transmission periods PS set to each display frame are disposed in the display frame with time intervals of a predetermined time length X placed therebetween. The active stylus 1 performs transmission of packets configuring the pen signal P such that the transmission fits in the packet transmission period PS.

The display controller 2 is configured such that it receives a packet transmitted from the active stylus 1 within each of a plurality of packet transmission periods PS of a plurality of display frames. Processes that are performed by the display controller 2 for the received packet are such as described hereinabove in connection with the first embodiment.

Further, the display controller 2 is configured such that it performs driving of a display device within a time interval of a predetermined time length X. Here, the predetermined time length X is set such that the time of the total value of predetermined time lengths X in each frame is a little longer than a period of time required to carry out display driving of all pixels, and the display controller 2 need not use all of the time intervals for the display driving. Therefore, the display controller 2 according to the present embodiment is configured such that it performs display driving while the start timing and the end timing of a display driving period DP within which the display driving is to be performed while the time intervals set between a plurality of packet transmission periods are maintained. More particularly, as depicted in FIG. 3, the display controller 2 is configured such that it adjusts the start timing of a display driving period DP within a time length RS from the start timing of a time interval and adjusts the end timing of the display driving period DP within the time length RS from the end timing of the time interval.

Figure 4:
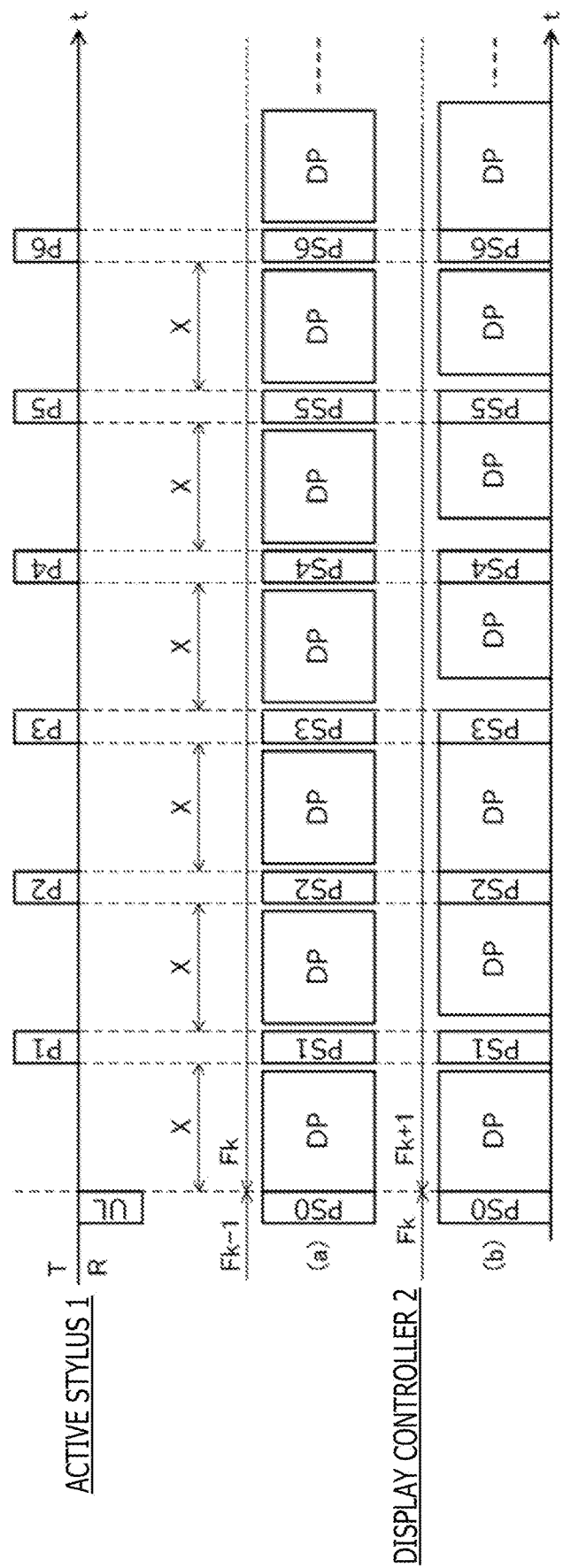
FIG. 4 is a view depicting a detection method of an active stylus according to the second embodiment of the present disclosure.

FIG. 4 is a view illustrating the detection method of the active stylus 1 according to the present embodiment. Portion (a) of FIG. 4 indicates disposition of a display driving period DP in the kth display frame Fk, and portion (b) of FIG. 4 depicts disposition of a display driving period DP in the k+1th display frame Fk+1. As depicted in FIG. 4, the display controller 2 performs display driving while it suitably changes the start timing and the end timing of each display driving period DP within a range within which the time intervals set between the plurality of packet transmission periods PS are maintained. Accordingly, the start timing and the end timing of the display driving period DP can be prevented from being fixed.

As described above, with the detection method of the active stylus 1 according to the present embodiment, the display controller 2 can change the start timing and the end timing of the display driving period DP without transmitting an auxiliary uplink signal. Accordingly, it becomes possible to eliminate at least a reduction in the display quality that may possibly be caused by fixation of the start timing and the end timing of the display driving period DP while the quantity of data that can be transmitted by a pen signal P is secured.

While the preferred embodiments of the present disclosure have been described, the present disclosure is not limited to such embodiments at all, and it is a matter of course that the present disclosure can be carried out in various manners without departing from the subject matter thereof.

For example, while the embodiments are described taking notice of detection of the active stylus 1, the present disclosure can be applied suitably also to the case in which detection of a touch by a finger or the like is performed. In this case, a transmission period for a touch detection signal is provided in place of the transmission period of a packet.

Further, the present disclosure can be applied suitably also to an apparatus (for example, a tablet terminal of the in-cell type) in which part of a plurality of linear electrodes described hereinabove serves also as an electrode for pixel driving in a display device (for example, as a common electrode in a liquid crystal display).

What is claimed is:

1. A method in a system including an active stylus and a display controller that detects the active stylus and that drives a display device, the method comprising:
    driving, by the display controller, the display device to display a first plurality of pixel data during a first display period in a first time period, wherein the display controller starts the driving of the display device to display the first plurality of pixel data a first amount of time after a beginning of the first time period, and the display controller ends the driving of the display device to display the first plurality of pixel data a second amount of time after the beginning of the first time period;

driving, by the display controller, the display device to display a second plurality of pixel data during a second display period in second time period, wherein the display controller starts the driving of the display device to display the second plurality of pixel data a third amount of time after a beginning of the second time period, and the display controller ends the driving of the display device to display the second plurality of pixel data a fourth amount of time after the beginning of the second time period, wherein the first display period in the first time period and the second display period in the second time period have a same time length, and wherein the first amount of time is different from the third amount of time, and the second amount of time is different from the fourth amount of time;

transmitting, by the active stylus, a first packet including a first plurality of bit values after the display controller stops the driving of the display device to display the first plurality of pixel data and before the display controller starts the driving of the display device to display the second plurality of pixel data; and receiving, by the display controller, the first packet including the first plurality of bit values after the display controller stops the driving of the display device to display the first plurality of pixel data and before the display controller starts the driving of the display device to display the second plurality of pixel data.

2. The method according to claim 1, wherein the display controller starts the driving of the display device to display the second plurality of pixel data at least a predetermined amount of time after the display controller ends the driving of the display device to display the first plurality of pixel data.

3. The method according to claim 1, further comprising:
selecting, by the display controller, the first amount of time;
selecting, by the display controller, the second amount of time;
selecting, by the display controller, the third amount of time; and
selecting, by the display controller, the fourth amount of time.

4. A method in a system including an active stylus and a display controller that detects the active stylus and that drives a display device, the method comprising:
driving, by the display controller, the display device to display a first plurality of pixel data during a first display period in a first time period, wherein the display controller starts the driving of the display device to display the first plurality of pixel data a first amount of time after a beginning of the first time period, and the display controller ends the driving of the display device to display the first plurality of pixel data a second amount of time after the beginning of the first time period;
driving, by the display controller, the display device to display a second plurality of pixel data during a second display period in second time period, wherein the display controller starts the driving of the display device to display the second plurality of pixel data a third amount of time after a beginning of the second time period, and the display controller ends the driving of the display device to display the second plurality of pixel data a fourth amount of time after the beginning of the second time period, wherein the first display period in the first time period and the second display period in the second time period have a same time length, and wherein the first amount of time is different from the third amount of time, and the second amount of time is different from the fourth amount of time;

driving, by the display controller, the display device to display a third plurality of pixel data during a third display period of a third time period, wherein the display controller starts the driving of the display device to display the third plurality of pixel data a fifth amount of time after a beginning of the third second time period, and the display controller ends the driving of the display device to display the third plurality of pixel data a sixth amount of time after the beginning of the third time period, and wherein the first display period in the first time period, the second display period in the second time period, and the third display period in the third time period have the same time length, and wherein the first amount of time is different from the third amount of time and the fifth amount of time, and the second amount of time is different from the fourth amount of time and the sixth amount of time.

5. The method according to claim 4,
wherein the display controller starts the driving of the display device to display the second plurality of pixel data at least a predetermined amount of time after the display controller ends the driving of the display device to display the first plurality of pixel data, and
wherein the display controller starts the driving of the display device to display the third plurality of pixel data at least the predetermined amount of time after the display controller ends the driving of the display device to display the second plurality of pixel data.

6. A method in a system including an active stylus and a display controller that detects the active stylus and that controls a display device, the method comprising:
setting, by the display controller, a given time interval between a plurality of packet transmission periods;
transmitting, by the display controller, a signal including a command for controlling operation of the active stylus, wherein the command includes timing information indicative of the plurality of packet transmission periods with the given time interval therebetween;
driving, by the display controller, the display device to display pixel data; and
changing, by the display controller, a start timing or an end timing of a display driving period during which the driving is performed, while the given time interval between the plurality of packet transmission periods is maintained.

7. The method according to claim 6, wherein the changing includes changing, by the display controller, the start timing and the end timing of the display driving period during which the display driving is performed, while the given time interval between the plurality of packet transmission periods is maintained.

8. The method according to claim 6, further comprising:
receiving, by the display controller, a first packet including a first plurality of bit values during a first one of the plurality of packet transmission periods; and receiving, by the display controller, a second packet including a second plurality of bit values during a second one of the plurality of packet transmission periods.

* * * * *